(12) United States Patent
Stettes et al.

(10) Patent No.: US 12,274,392 B2
(45) Date of Patent: Apr. 15, 2025

(54) APPLIANCE COMPONENT FAULT DETECTION

(71) Applicant: Duke Manufacturing Co., St. Louis, MO (US)

(72) Inventors: Gregory Glen Stettes, St. Louis, MO (US); Benjamin Kingbay Wann, St. Louis, MO (US); Thomas Earl Kieffer, St. Louis, MO (US); Madeline Elaine Marsh, St. Louis, MO (US); Jeffrey Allen Stafford, St. Louis, MO (US)

(73) Assignee: DUKE MANUFACTURING CO.

( * ) Notice: Subject to any disclaimer, the term of this patent is extended or adjusted under 35 U.S.C. 154(b) by 891 days.

(21) Appl. No.: 17/299,823

(22) PCT Filed: Dec. 4, 2019

(86) PCT No.: PCT/US2019/064370
§ 371 (c)(1),
(2) Date: Jun. 4, 2021

(87) PCT Pub. No.: WO2020/117885
PCT Pub. Date: Jun. 11, 2020

(65) Prior Publication Data
US 2021/0369049 A1    Dec. 2, 2021

Related U.S. Application Data

(60) Provisional application No. 62/775,247, filed on Dec. 4, 2018.

(51) Int. Cl.
*G05B 23/00* (2006.01)
*A47J 36/32* (2006.01)
(Continued)

(52) U.S. Cl.
CPC .......... *A47J 36/321* (2018.08); *G06F 1/3206* (2013.01); *H04L 12/40* (2013.01); *H04L 12/4641* (2013.01); *H04L 2012/40215* (2013.01)

(58) Field of Classification Search
CPC ...... A47J 36/321; G06F 1/3206; H04L 12/40; H04L 12/4641; H04L 2012/40215;
(Continued)

(56) References Cited

U.S. PATENT DOCUMENTS 5,451,476 A * 9/1995 Josefowicz ............. H01M 4/02
429/235
6,129,284 A * 10/2000 Adams .................. F24H 15/174
236/94
(Continued)

FOREIGN PATENT DOCUMENTS

DE      10231797 A1    1/2004
WO    2016/085942 A1   6/2016

OTHER PUBLICATIONS

International Search Report dated Mar. 17, 2020 relating to PCT Application No. PCT/US2019/064370, 6 pages.
(Continued)

*Primary Examiner* — Tai T Nguyen
(74) *Attorney, Agent, or Firm* — Stinson LLP

(57) ABSTRACT

An appliance having a current sensor configured to monitor load current in the appliance associated with operation of one or more components for determining a fault condition thereof. The appliance comprises a smart controller configured to control operations of the appliance and the one or more components each configured to perform an operation of the appliance in response to the smart controller. An input/output (IO) circuit coupled to the smart controller via a local data bus is configured to receive commands from the
(Continued)

smart controller and to control the one or more components in response thereto.

19 Claims, 14 Drawing Sheets

(51) Int. Cl.
*G06F 1/3206* (2019.01)
*H04L 12/40* (2006.01)
*H04L 12/46* (2006.01)

(58) Field of Classification Search
CPC ......... F24C 7/08; H05B 1/0263; H05B 6/645; H05B 6/6485; G05B 19/042; G05B 2219/21154; G05B 2219/23253; G05B 2219/24065; G05B 2219/2613; G05B 2219/2643
USPC ....................................................... 340/679
See application file for complete search history.

(56) References Cited

U.S. PATENT DOCUMENTS

| | | | |
|---|---|---|---|
| 9,791,206 B1* | 10/2017 | Hall | ........................ H05B 6/666 |
| 2007/0178885 A1* | 8/2007 | Lev | ........................ H04W 12/06 |
| | | | 713/168 |
| 2011/0074589 A1* | 3/2011 | Han | .................... H04L 12/2825 |
| | | | 340/603 |
| 2012/0124859 A1* | 5/2012 | May | ........................ D06F 34/28 |
| | | | 34/572 |
| 2016/0358722 A1 | 12/2016 | Lakshmanan et al. | |
| 2018/0038029 A1* | 2/2018 | Beals | ........................ D06F 33/47 |
| 2018/0321652 A1 | 11/2018 | Jablokov et al. | |

OTHER PUBLICATIONS

Written Opinion dated Mar. 17, 2020 relating to PCT Application No. PCT/US2019/064370, 6 pages.

* cited by examiner

APPLIANCE COMPONENT FAULT DETECTION

BACKGROUND

As kitchen appliances become increasingly more sophisticated and provide greater functionality, there is greater need for performing comprehensive component performance diagnostics.

SUMMARY

In an aspect, an appliance or other food preparation apparatus comprises a smart controller configured to control operations of the appliance and one or more components each configured to perform an operation of the appliance in response to the smart controller. An input/output (IO) circuit coupled to the smart controller via a local data bus is configured to receive commands from the smart controller and to control the one or more components in response thereto. The appliance also comprises a plurality of sensors coupled to the IO circuit. At least one of the sensors is a current sensor configured to monitor load current in the appliance associated with operation of the one or more components for determining a fault condition thereof.

In another aspect, an appliance comprises a smart controller configured to control operations of the appliance and one or more components each configured to perform an operation of the appliance in response to the smart controller. An input/output (IO) circuit coupled to the smart controller via a local data bus is configured to receive commands from the smart controller and to control of one or more components in response thereto. The appliance also comprises a plurality of sensors coupled to the IO circuit. At least one of the sensors is a voltage detection sensor configured to monitor a mains supply voltage to the appliance for determining a fault condition thereof.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
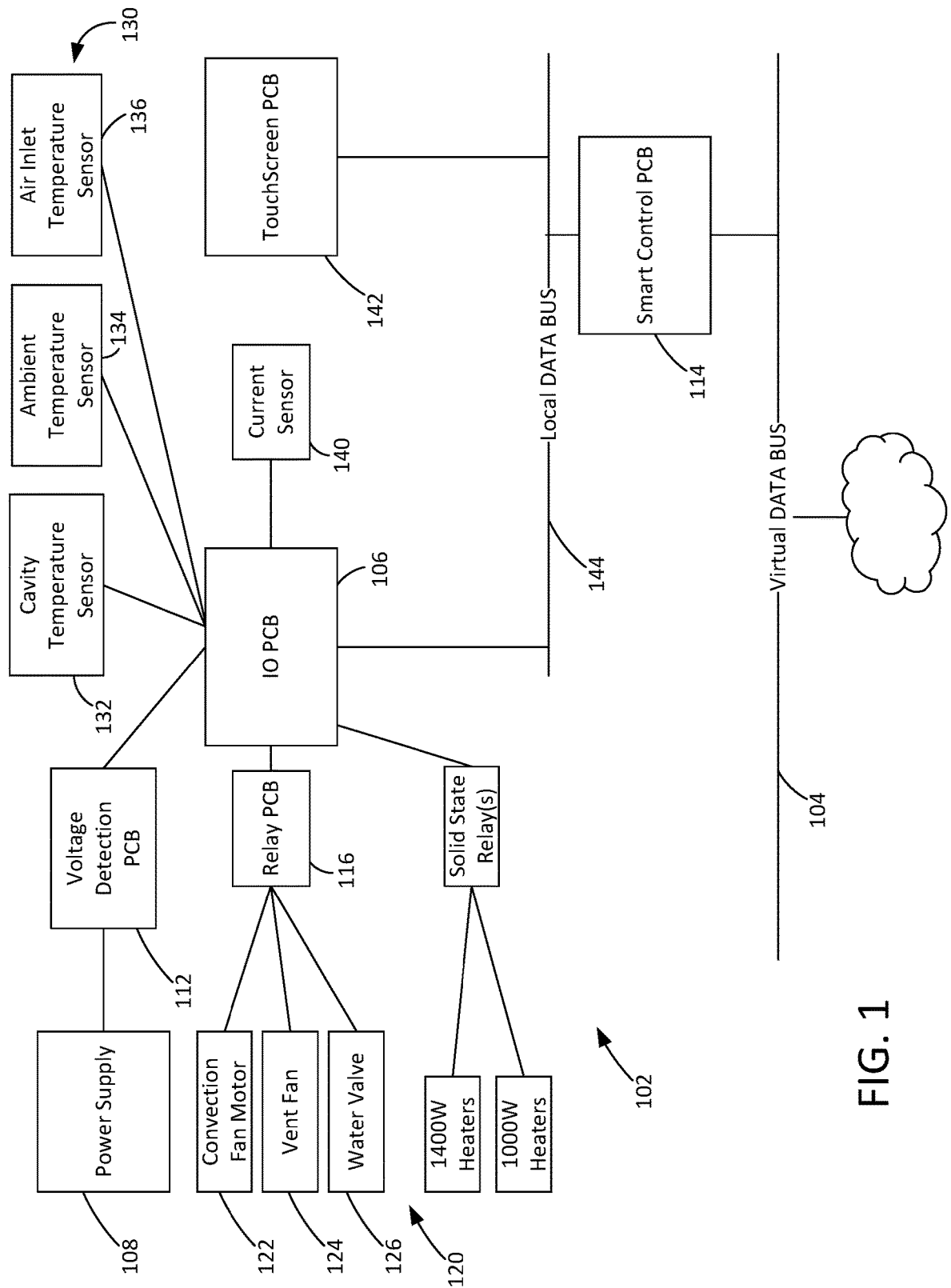
FIG. 1 is a block diagram of an appliance in accordance with an embodiment of the present disclosure.

FIG. 1 illustrates a system embodying aspects of the present disclosure for accessing configuration, status, usage, and/or diagnostic data stored on a restaurant appliance 102 or the like. In the illustrated embodiment, the system includes a restaurant appliance 102 (e.g., an oven) connected to the cloud via a virtual data bus 104. The appliance 102 includes an input/output (IO) printed circuit board (PCB) 106 powered by a power supply 108. A voltage detection PCB 112 monitors the supply voltage. The IO PCB 106 is responsive to a smart control PCB 114 to control operations of appliance 102. As shown in FIG. 1, the IO PCB 106 sends commands to a relay PCB 116 associated with various components 120 of appliance 102, such as a convection fan motor 122, a vent fan 124, and a water valve 126. It is to be understood that appliance 102 could include other components in addition to or instead of the illustrated components. In addition, the IO PCB 106 receives feedback from a plurality of sensors, generally indicated at 130, such as a cavity temperature sensor 132, an ambient temperature sensor 134, and an air inlet temperature sensor 136. As described below, signals provided by a current sensor 140, voltage detect PCB 112, and/or temperature sensors 130 coupled to the IO PCB 106 can be used to identify faults in appliance 102.

The appliance 102 further includes a touchscreen PCB 142, which permits a user to interact with appliance 102.

Although described herein with respect to appliance 102, it is to be understood that aspects of the invention include a food preparation apparatus generally. Such a food preparation apparatus may include various food cooking devices. An example of one such cooking device is an oven, and it will be understood that other cooking devices, such as fryers, microwaves, conditioning cabinets (e.g. for dough, etc.), grills, and the like can be used without departing from the scope of the present invention. The food preparation apparatus may also include a food holding apparatus such as one or more food holding units adapted for holding food at a suitable temperature (e.g., cool temperature, ambient temperature, and/or warm temperature) such as a steam table, an infrared holding unit, a heat sink holding unit, or other holding unit, etc. The food preparation apparatus may also include various other food handling apparatus such as food washers, sanitizers, or processors, etc.

In the illustrated embodiment, the smart control PCB 114 communicates with the IO PCB 106 and the touchscreen PCB 142 via a local data bus 144 (e.g., a physical Controller Area Network (CAN) bus) using a publication/subscription ("pub/sub") or other suitable protocol. The smart control PCB 114 communicates with the cloud via the virtual data bus 104.

From a hardware perspective, smart control PCB 114 includes a processor and memory. From a software perspective, smart control PCB 114 includes a state machine application, a web server, a database, and a collection of application programming interfaces. The state machine application, web server, database, and application programming interfaces communicate with each other via virtual data bus 104 provided by software executing on smart control PCB 114. The state machine application bridges the physical local data bus 144 to virtual data bus 104 on smart control PCB 114. The web server provides the graphical user interface (GUI) that enables a user to configure settings for the recipes and firmware for appliance 102. The database stores data representative of recipes and firmware. In an embodiment, a processor of smart control PCB 114 executes one or more APIs that enable other applications to communicate with smart control PCB 114. In this manner, smart control PCB 114 is capable of functioning as a hub in a smart kitchen.

In an alternative embodiment, touchscreen PCB 142 and smart control PCB 114 are implemented on a single board.

Figure 2:
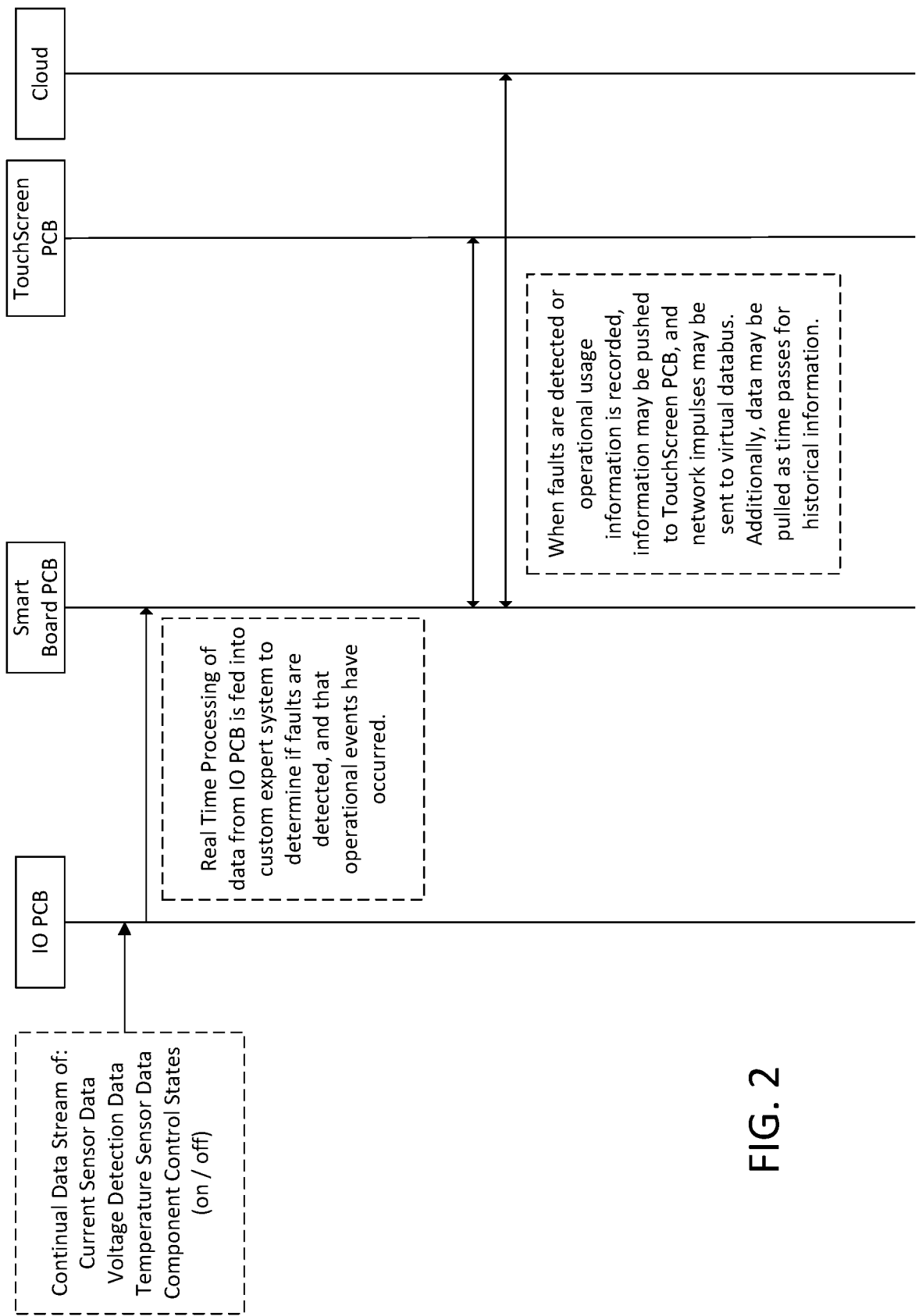
FIG. 2 illustrates an exemplary data flow from an input/output board to a smart control board of FIG. 1.

The appliance 102 captures current sensor data that represents load currents, voltage detect PCB (voltage sensor) data that represents mains supply voltage, and temperature sensor data during various operating conditions of the components 120 of appliance 102. FIG. 2 illustrates an exemplary data flow from IO PCB 106 to smart control PCB 114. FIG. 2 further shows an exemplary data flow to and from smart control PCB 114 and touchscreen PCB 142 and an exemplary data flow to and from smart control PCB 114 and the cloud. As shown, IO PCB 106 receives a data stream of current sensor data, voltage detection data, and temperature sensor data, as well as information concerning the control states of components 120 of appliance 102. The smart control PCB 114 executes a custom expert system that performs real time processing of this data to determine if any faults are detected and which operational events have occurred. In an embodiment, smart control PCB 114 pushes one or more notifications to touchscreen PCB 142 and/or the cloud when faults are detected. The smart control PCB 114 is also capable of pulling historical information.

Current sensor data represents normal load currents during various operating conditions of the appliance components under nominal voltage, low voltage, and high voltage conditions of the mains voltage supplied to the appliance. In an example, load current in an oven operating in a convection low state is 1.060 amps at nominal voltage, 0.950 amps at low voltage 10% below nominal, and 1.123 amps at high voltage 10% above nominal. Advantageously, the thresholds for determining the existence of fault conditions are a function of the normal load currents within a margin of error for low voltage and high voltage conditions.

In an embodiment fault definitions are a function of a) the current sensed by the current sensor 140, b) heating and cooling rates sensed by the temperature sensors 130, c) sensor signals, d) CAN communication, and e) voltage sensed by voltage detection PCB 112 depending on the operating state of the appliance 102.

As an example, if the current sensor data indicates the load current contribution does not exceed 400 milliamps after a timeout of, for example, 3 seconds during a low speed convection fan operating condition, smart control PCB 114 triggers a fault. In other words, smart control PCB 114 is responsive to the component fault logic, which considers current sense data, operating condition of the component 120, fault preconditions (e.g., timing to permit load current to settle), and/or duration within window for detecting a fault.

Figure 3:
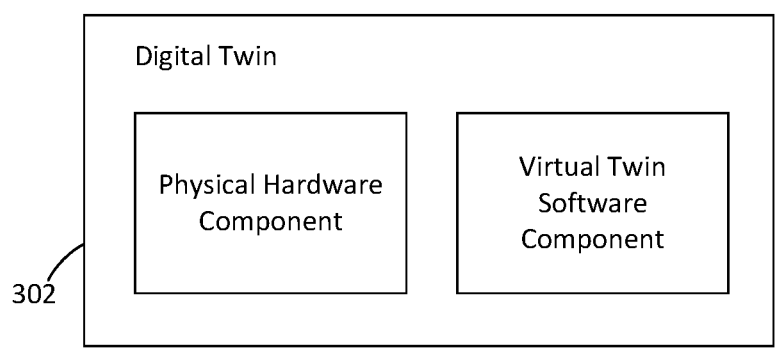
FIG. 3 is a block diagram illustrating the appliance of FIG. 1 as a digital twin.

Referring now to FIG. 3, aspects of the present disclosure involve establishing appliance 102 as a digital twin 302. As is known in the art, digital twins integrate artificial intelligence, machine learning, and software analytics with spatial network graphs to create living digital simulation models that update and change as their physical counterparts change. The digital twin 302 continuously learns and updates itself from multiple sources to represent its near real-time status, working condition, or position. This learning system learns: from itself using sensor data that conveys various aspects of its operating condition; from human experts, such as engineers with deep and relevant industry domain knowledge; from other similar machines; from other similar fleets of machines; and from the larger systems and environment in which it may be a part of. The digital twin 302 also integrates historical data from past machine usage to factor into its digital model.

The smart control PCB 114 of appliance 102 operates a software digital twin style system with the physical components of the system being continually monitored in real time to create a learning system, whereby appliance 102 can self-diagnose conditions that are failure modes. In an embodiment, appliance 102 operates under autonomous control without a feedback loop from a data stream of a full fleet of appliances 102 deployed into the system. As an Edge-connected IoT device, the digital twin 302 may be continually improved to understand their environment better and better.

Figure 4:
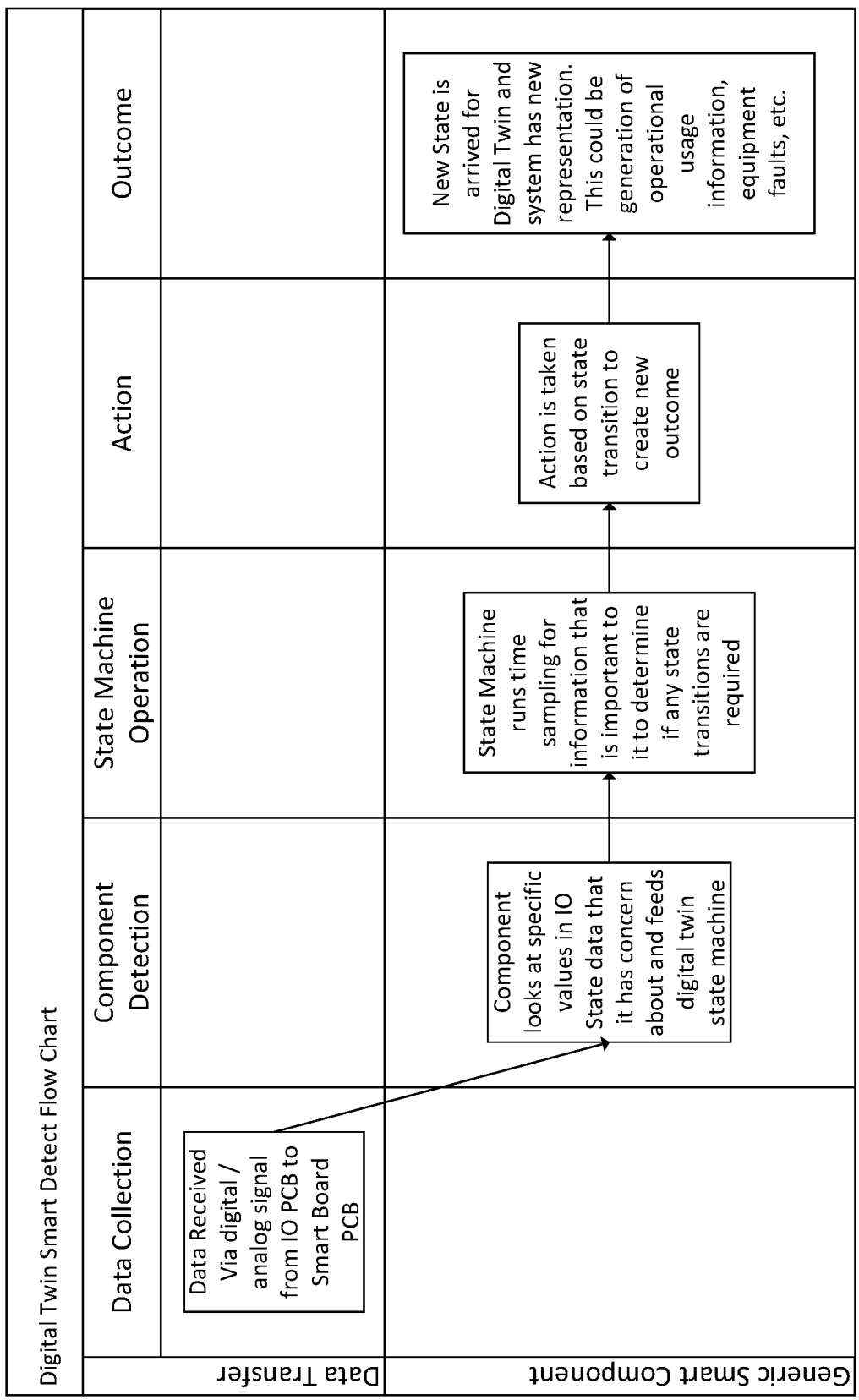
FIG. 4 is an exemplary flow diagram for processing the data collected at the input/output board of FIG. 1.
Figure 5A:
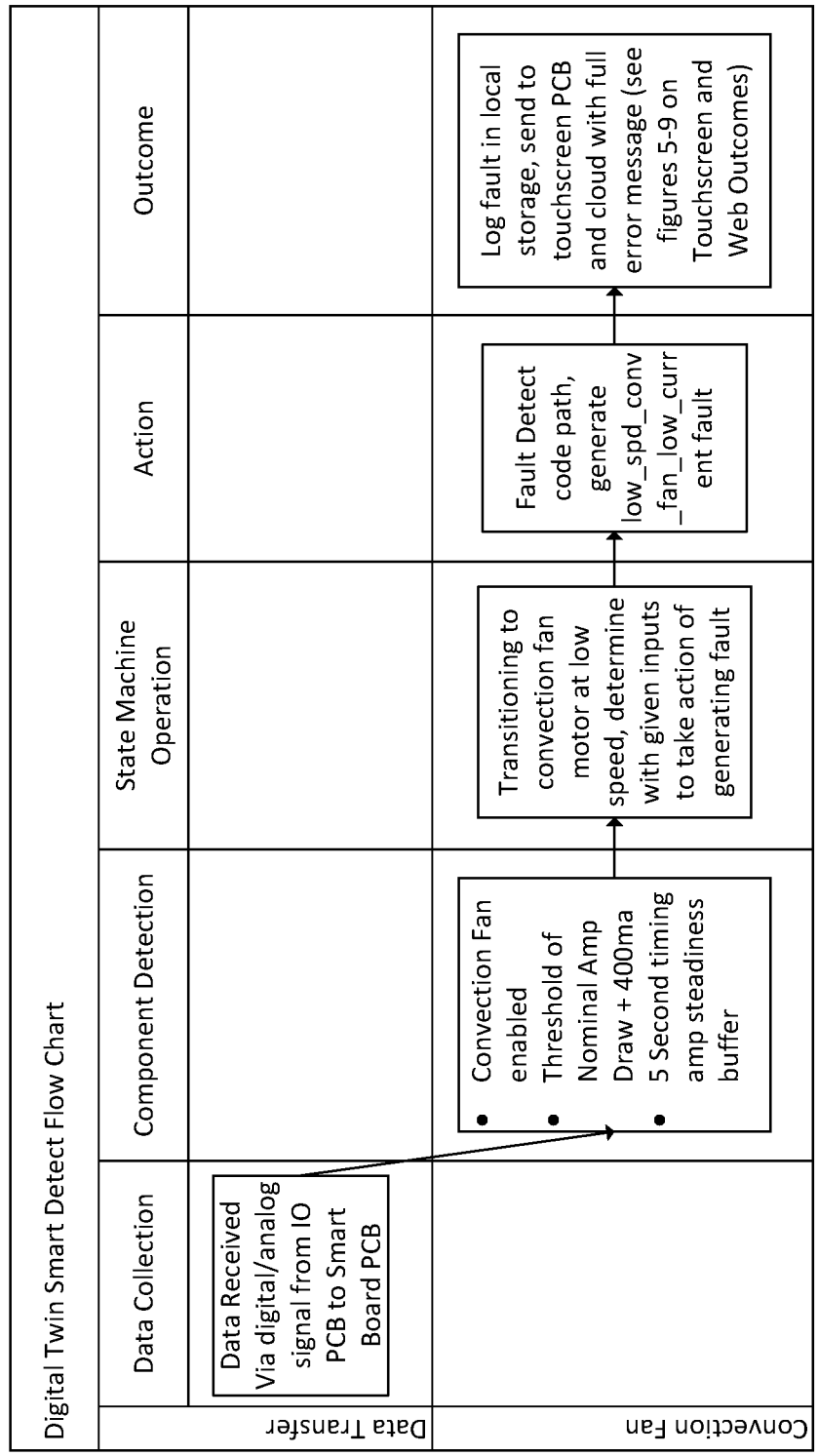
FIGS. 5A-5C are exemplary flow diagrams for processing the data collected at the input/output board of FIG. 1 for specific components of the appliance of FIG. 1.
Figure 5B:
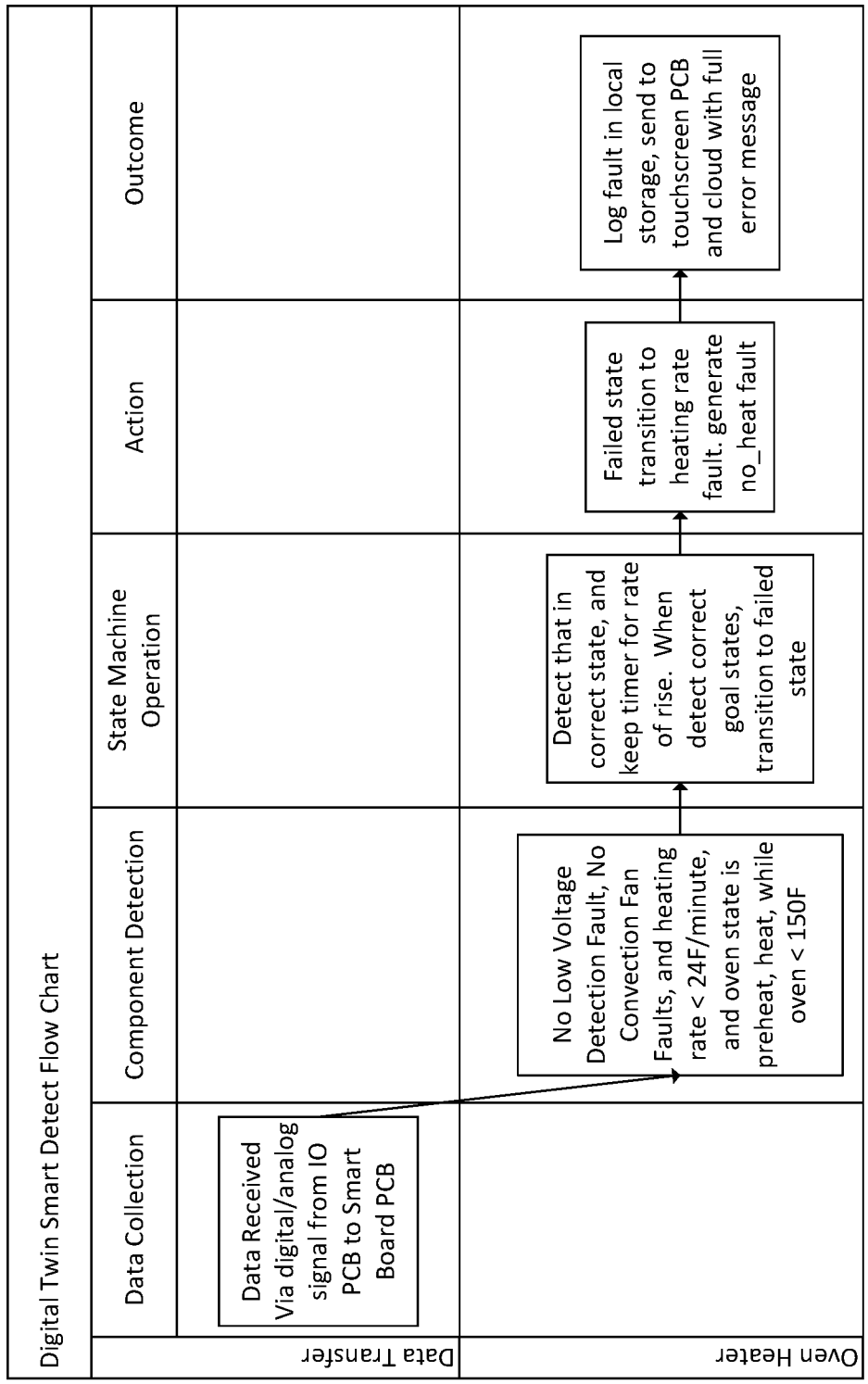
Figure 5C:
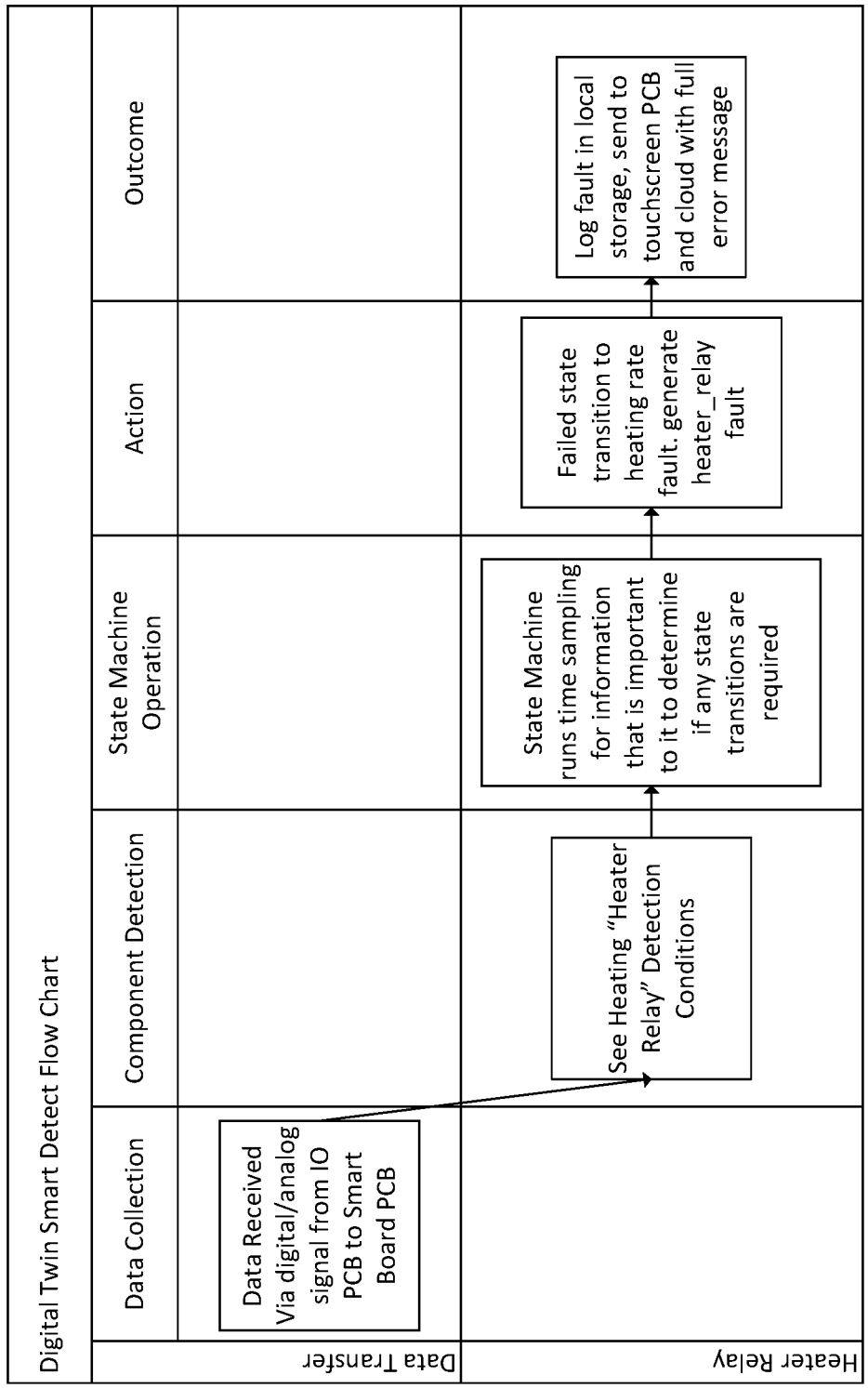

FIG. 4 is an exemplary flow diagram for processing the data collected at IO PCB 106 to generate operational usage information, equipment faults, and the like. FIGS. 5A-5C are exemplary flow diagrams for specific components 120 (e.g., convection fan, oven heater, and heater relay) in accordance with an embodiment of the invention.

Figure 6:
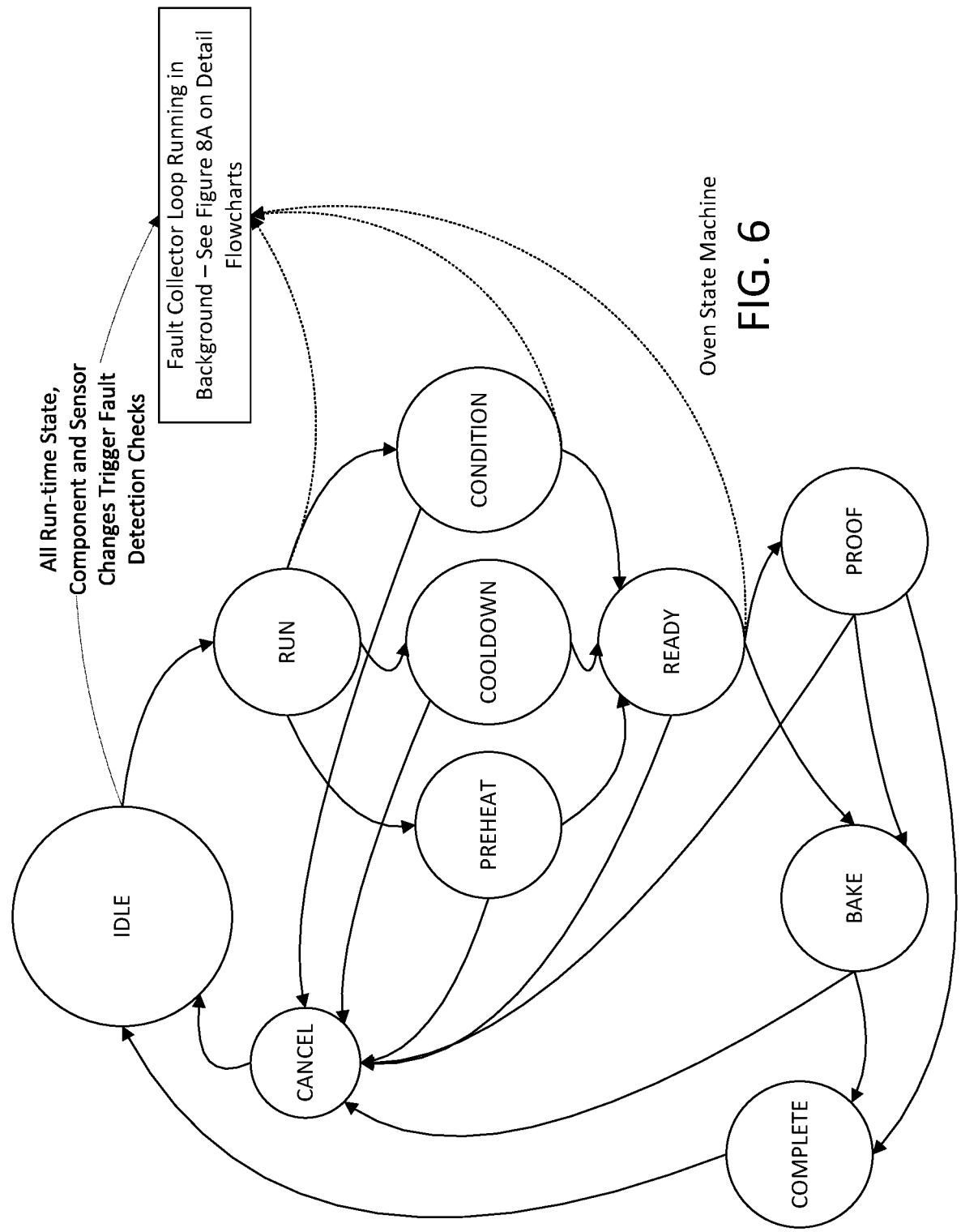
FIG. 6 is an exemplary state diagram for the appliance of FIG. 1.
Figure 7:
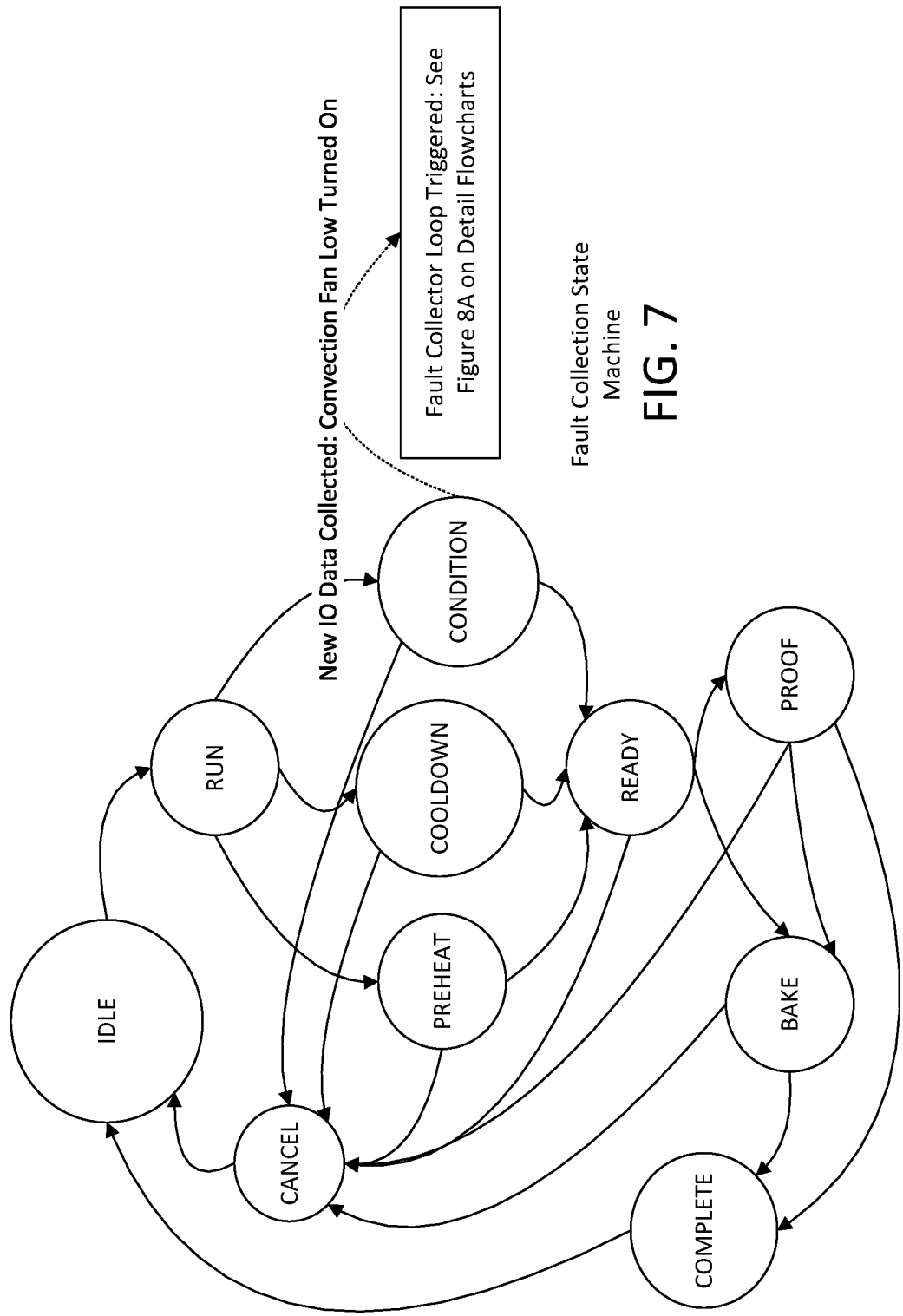
FIG. 7 is an exemplary state diagram for the appliance of FIG. 1 with respect to a specific component thereof.

The appliance 102 has several functional modes, which can be referred to as "states." For example, the states of an oven in one embodiment include: OFF, IDLE, PRE-HEAT, RUN, and DIAGNOSTICS. Referring now to the state machine diagram of FIG. 6, a fault collector loop runs in the background from each state of appliance 102. For the oven of FIG. 6, the states include: idle, run, condition, and ready. FIG. 7 provides an example for convection fan data arising during the condition state.

Figure 8A:
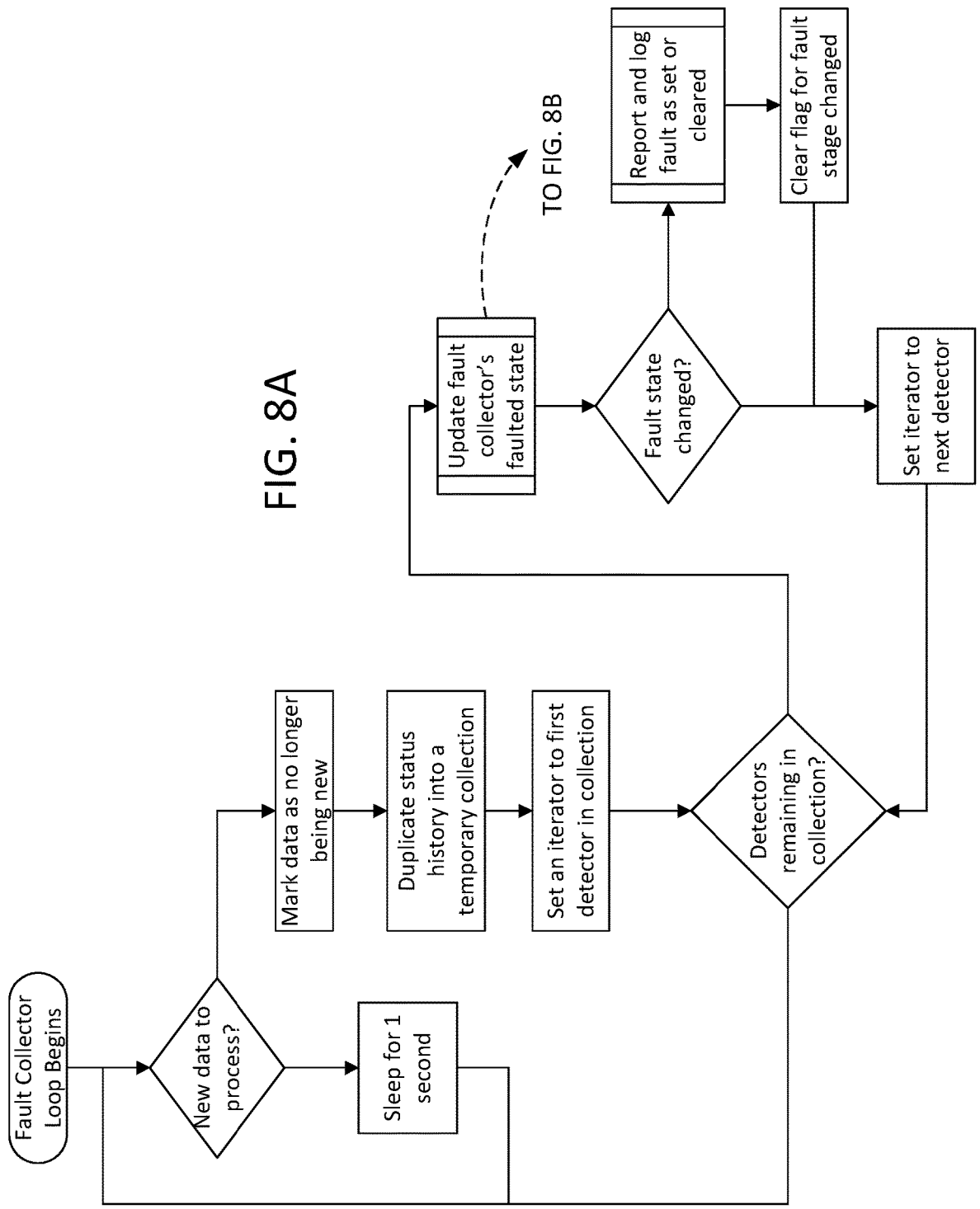
FIGS. 8A-8D are flow diagrams illustrating exemplary fault collection and detection operations executed by the smart control board of FIG. 1.
Figure 8B:
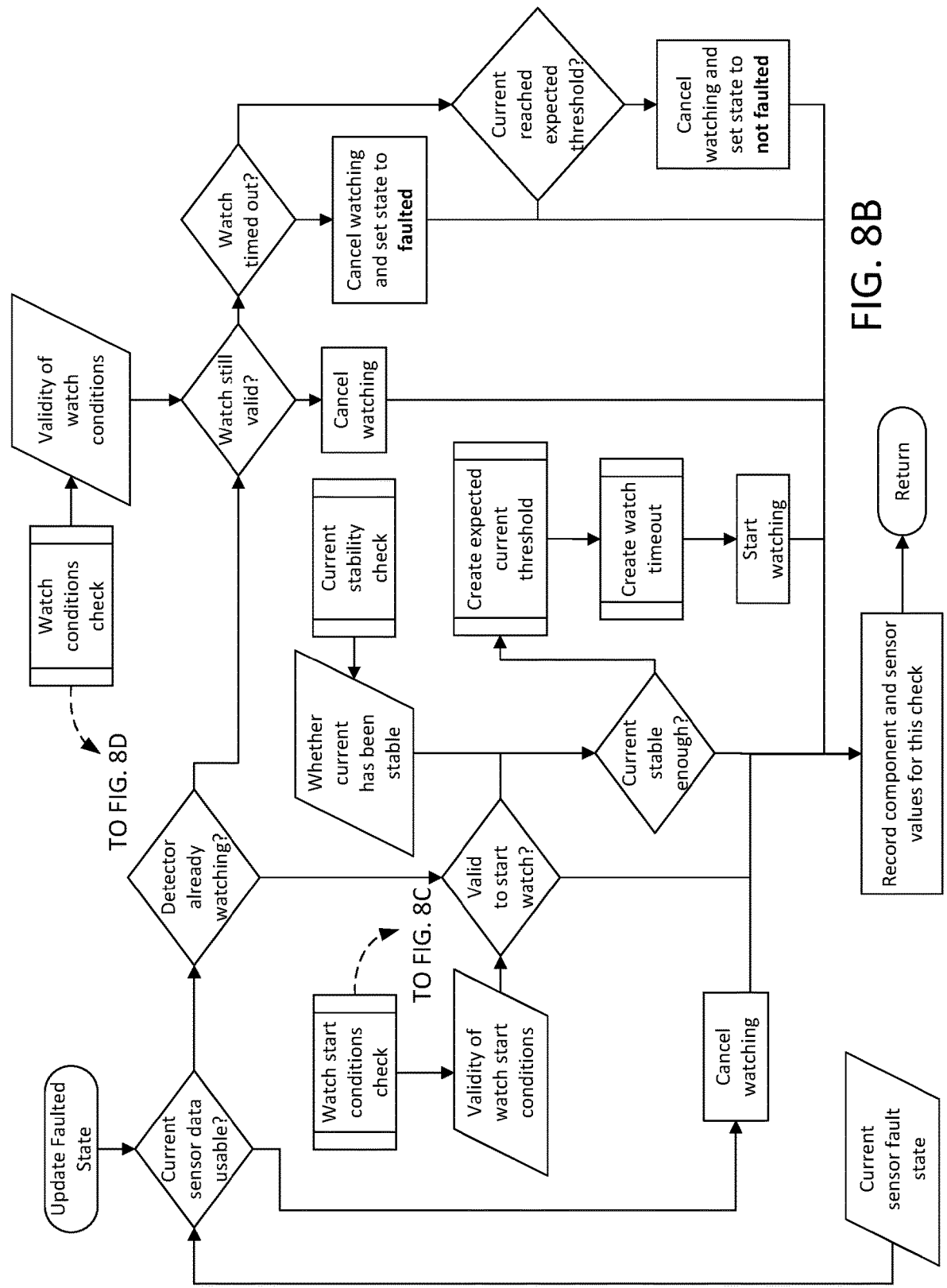
Figure 8C:
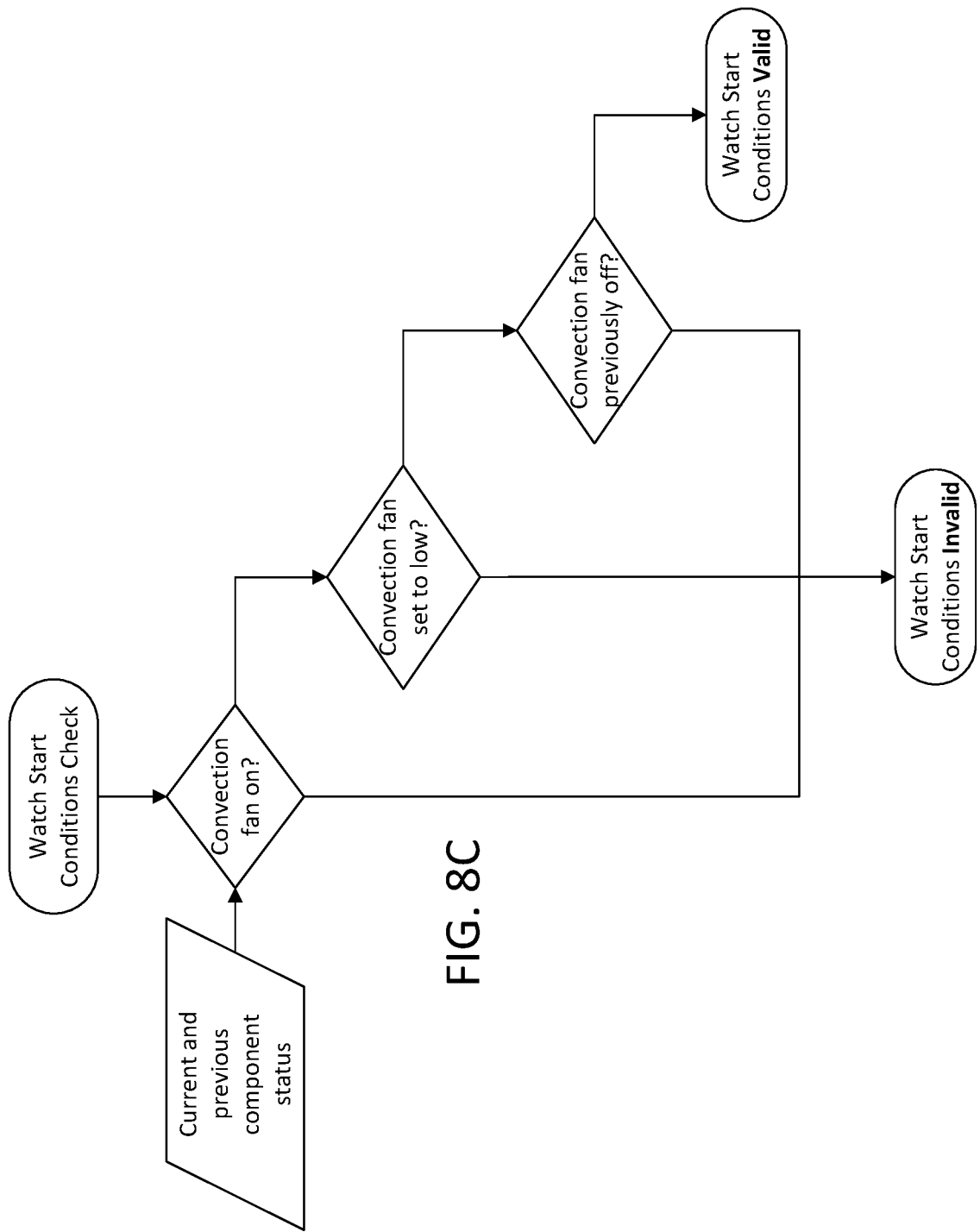
Figure 8D:
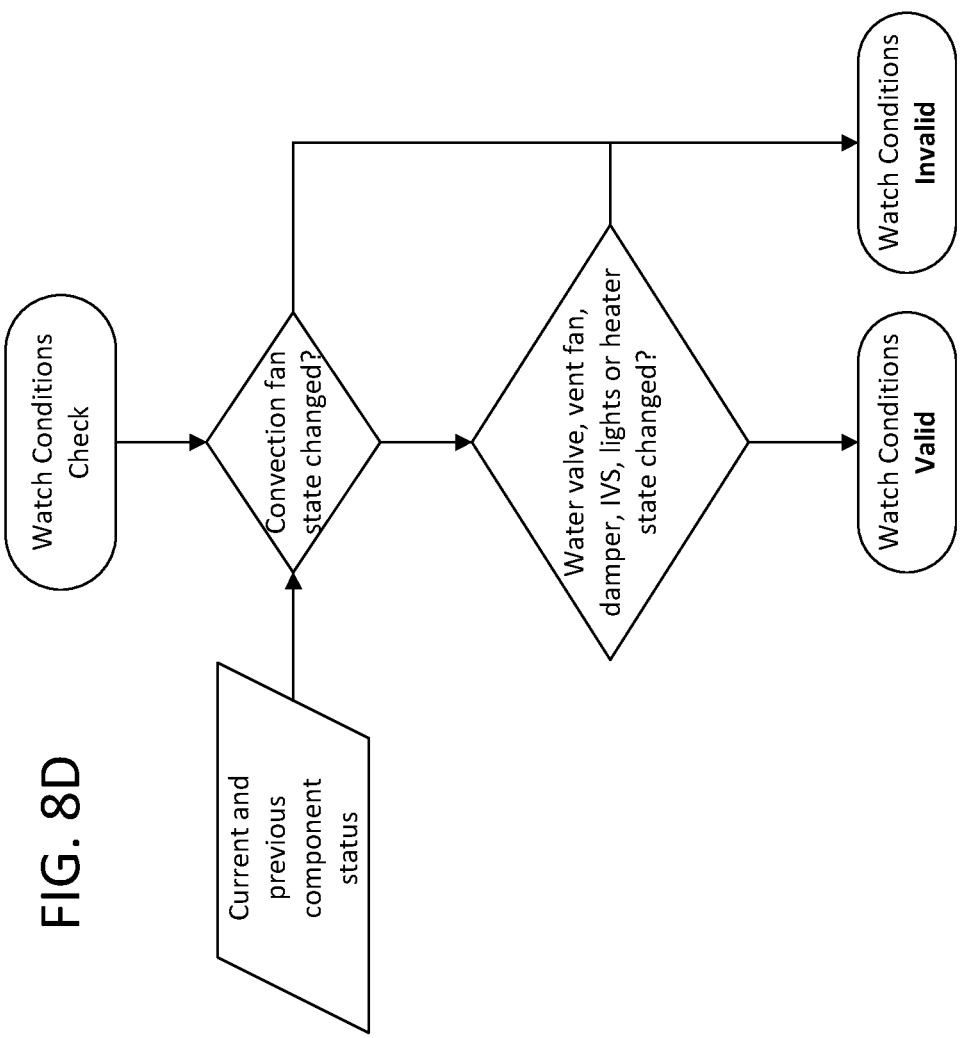
Figure 9:
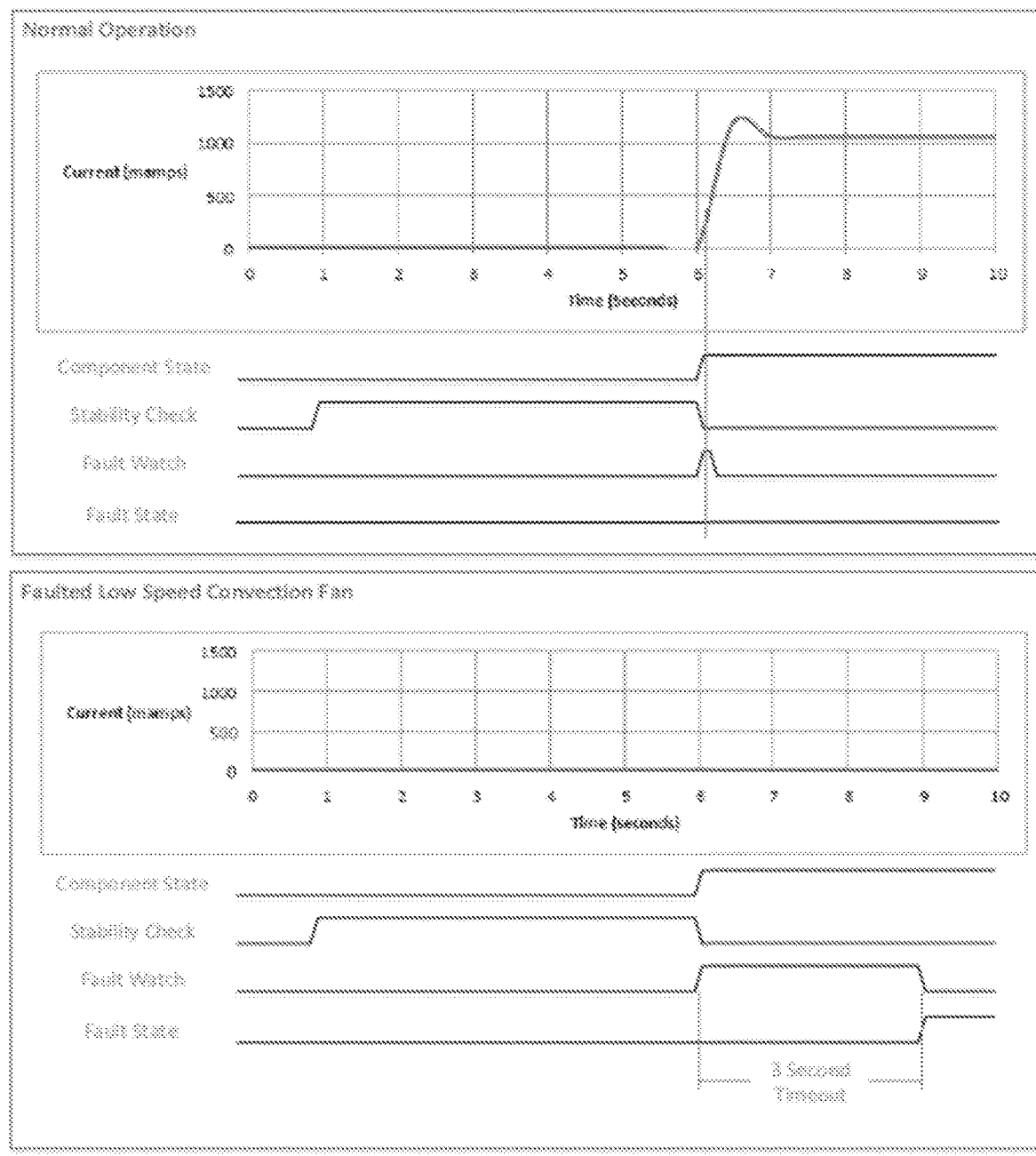
FIG. 9 is an exemplary timing diagram in accordance with the fault collections and detection operations of FIGS. 8A-8D.

FIGS. 8A-8D are flow diagrams illustrating exemplary fault collection and detection operations executed by smart control PCB 114. FIG. 8A illustrates the fault collector main loop according to an embodiment. This applies to any of the sensors (e.g., sensors 130, 140). FIG. 8B, on the other hand, illustrates an exemplary fault detection check based on data received from the current sensor 130. Further to the example, FIG. 8C illustrates an exemplary routine for detecting a low current fault at start associated with the low speed convection fan operating condition and FIG. 8D illustrates an exemplary routine for continuing to watch for the fault condition after start. FIG. 9 is an exemplary timing diagram in accordance with the fault collections and detection operations of FIGS. 8A-8D.

In an embodiment, appliance 102 transfers stateful information to exemplary web-based user interfaces. For example, appliance 102 utilizes web sockets to route data as it happens in real-time to the remote computer to permit viewing a representation of the current information or even a view of the touchscreen of appliance 102.

User interfaces presented on touchscreen PCB 142 may be used to notify the user, at appliance 102, of fault conditions. In an embodiment, the touchscreen displays a pop-up button in response to the occurrence of a fault. When selected, the touchscreen will display a diagnostics screen to view the likely failed part(s), the fault, and corrective action(s).

The system operating in accordance with aspects of the present disclosure performs one or more of the following functions: accessing data; accessing event logs; aggregating data from multiple appliances 102; analyzing data to detect and predict faults; and automatically initiate corrective action based on the data.

In an embodiment, the system permits access to data (i.e., configuration, status, usage, event, and/or fault data) and event logs stored on a memory of appliance 102 via an application programmer interface (API) to a human machine interface such as a touch screen, web interface, or remote software entity. Interfaces such as the touch screen, web, and remote software entity may be accessed from a computer/ mobile device communicating on the same local network as appliance 102 or from a remote computer/mobile device over the Internet.

Configuration data as referenced above provides configuration settings of appliance 102, such as messaging and alarms. When accessed remotely, this information will provide real-time information to help troubleshoot operational questions/issues. For example, remotely accessing the software version enables identification of any software features or "bug fixes" that are available for appliance 102.

Status data provides the real-time status of appliance 102 for various components 120.

Usage data includes, for example, recipe count data and component hours. The recipe count data provides a count of the number of times each recipe has been implemented by appliance 102. This data may be broken down into the number of times each recipe has been implemented: (a) for the life of appliance 102, (b) over a resettable period, and (c) over a 24-hour period. The component hours include total run times and counts for each component 120 of each appliance 102. In addition to total times, resettable times can be used when a component is serviced or replaced. This data enables correlating component life with reliability testing to better predict life expectancy and generate predictive maintenance plans.

Event data provides a detailed, time-stamped rolling history log to complement the usage data. The event data includes states of appliance 102, events triggered on a specific interval (e.g., 5 minutes), events triggered on user inputs, and specific events of interest (e.g., alarms, faults). This data is useful for understanding operations behavior, operations compliance, and troubleshooting.

Fault data provides information about faults experienced by appliance 102 components. The fault data is viewable both on the touchscreen of appliance 102 and/or via a remote computer.

Aggregating configuration, status, usage, event, and/or fault data from multiple appliances 102 enables analysis of the aggregated data to detect patterns in the data and/or anomalous data values that may be indicative of a fault or other operating condition of interest. For instance, predictive analytics performed on the data can reveal when future faults are likely to occur and when maintenance of appliance 102 should be undertaken to mitigate or eliminate those faults.

In an embodiment, data is stored on the oven and communicated to the oven like a remote data store and stored in aggregate on the cloud. Storing the data from an oven located in aggregate on the cloud generates critical mass of data and algorithm data mining to find when parts look like they will need service etc. The oven stores the data on the cloud for post processing and superior compute power. In this manner, the aggregate data permits predictive maintenance.

Aspects of the invention involve restaurant appliances 102 (e.g., ovens) that collect and store data about appliance configuration, status, usage, events, and faults. In an embodiment, the data is stored on a memory device of appliance 102 and/or on a server or in a central database (i.e., the cloud).

Embodiments within the scope of the present disclosure also include computer-readable media for carrying or having computer-executable instructions or data structures stored thereon. Such computer-readable media can be any available media that can be accessed by a special purpose computer and comprises computer storage media and communication media. By way of example, and not limitation, computer storage media include both volatile and nonvolatile, removable and non-removable media implemented in any method or technology for storage of information such as computer readable instructions, data structures, program modules or other data. Computer storage media are non-transitory and include, but are not limited to, random access memory (RAM), read only memory (ROM), electrically erasable programmable ROM (EEPROM), compact disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired non-transitory information in the form of computer-executable instructions or data structures and that can be accessed by a computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory computer storage media, including nonvolatile and volatile memory types. A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, SSDs, and the like.

Communication media typically embody computer readable instructions, data structures, program modules or other data in a modulated data signal such as a carrier wave or other transport mechanism and includes any information delivery media.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An appliance comprising:
a smart controller configured to control operations of the appliance;
one or more components each configured to perform an operation of the appliance in response to the smart controller;
an input/output (IO) circuit coupled to the smart controller via a local data bus, the IO circuit configured to receive commands from the smart controller and to control of one or more components in response thereto; and
a plurality of sensors coupled to the IO circuit, at least one of the sensors comprising a current sensor configured to monitor load current in the appliance associated with operation of the one or more components under nominal voltage, low voltage, and high voltage conditions of a mains voltage supplied to the appliance for determining a fault condition thereof.

2. The appliance of claim 1, wherein the smart controller is configured to execute an expert system for determining the fault condition of the one or more components based on the monitored load current.

3. The appliance of claim 1, further comprising a relay circuit coupled to the IO circuit, the relay circuit associated with the one or more components of the appliance and configured to switch on and off the one or more components responsive to the commands from the smart controller.

4. The appliance of claim 1, wherein the smart controller is coupled to a cloud service via a virtual data bus.

5. The appliance of claim 4, wherein sensed current data representative of the monitored load current is aggregated and stored remotely from the appliance at the cloud service.

6. The appliance of claim 1, further comprising a touchscreen controller coupled to the IO circuit and the smart controller via the local data bus, the touchscreen controller configured for interaction with a user of the appliance.

7. The appliance of claim 1, further comprising a power supply coupled to the IO circuit for supplying power thereto.

8. The appliance of claim 1, wherein the one or more components are one or more of the following: a convection fan motor, a vent fan, and a water valve.

9. The appliance of claim 1, wherein the sensors are selected from the group consisting of: a cavity temperature sensor, an ambient temperature sensor, an air inlet temperature sensor, a voltage detection sensor, and the current sensor.

10. An appliance comprising:
a smart controller configured to control operations of the appliance;
one or more components each configured to perform an operation of the appliance in response to the smart controller;
an input/output (IO) circuit coupled to the smart controller via a local data bus, the IO circuit configured to receive commands from the smart controller and to control of one or more components in response thereto; and
a plurality of sensors coupled to the IO circuit, at least one of the sensors comprising a voltage detection sensor configured to monitor a mains supply voltage to the appliance for determining a fault condition thereof.

11. The appliance of claim 10, wherein the plurality of sensors comprises a current sensor configured to monitor load current in the appliance associated with operation of the one or more components for determining the fault condition thereof.

12. The appliance of claim 10, wherein the smart controller is configured to execute an expert system for determining the fault condition of the one or more components based on the monitored mains supply voltage.

13. The appliance of claim 10, further comprising a relay circuit coupled to the IO circuit, the relay circuit associated with the one or more components of the appliance and configured to switch on and off the one or more components responsive to the commands from the smart controller.

14. The appliance of claim 10, wherein the smart controller is coupled to a cloud service via a virtual data bus.

15. The appliance of claim 14, wherein data acquired by the plurality of sensors is aggregated and stored remotely from the appliance at the cloud service.

16. The appliance of claim 10, further comprising a touchscreen controller coupled to the IO circuit and the smart controller via the local data bus, the touchscreen controller configured for interaction with a user of the appliance.

17. The appliance of claim 1, further comprising a power supply coupled to the IO circuit for supplying power thereto.

18. The appliance of claim 10, wherein the one or more components are one or more of the following: a convection fan motor, a vent fan, and a water valve.

19. The appliance of claim 10, wherein the sensors are selected from the group consisting of: a cavity temperature sensor, an ambient temperature sensor, an air inlet temperature sensor, a current sensor, and the voltage detection sensor.

* * * * *